INVENTOR.
OSKAR DIEM
BY
Schroeder & Siegfried
ATTORNEYS

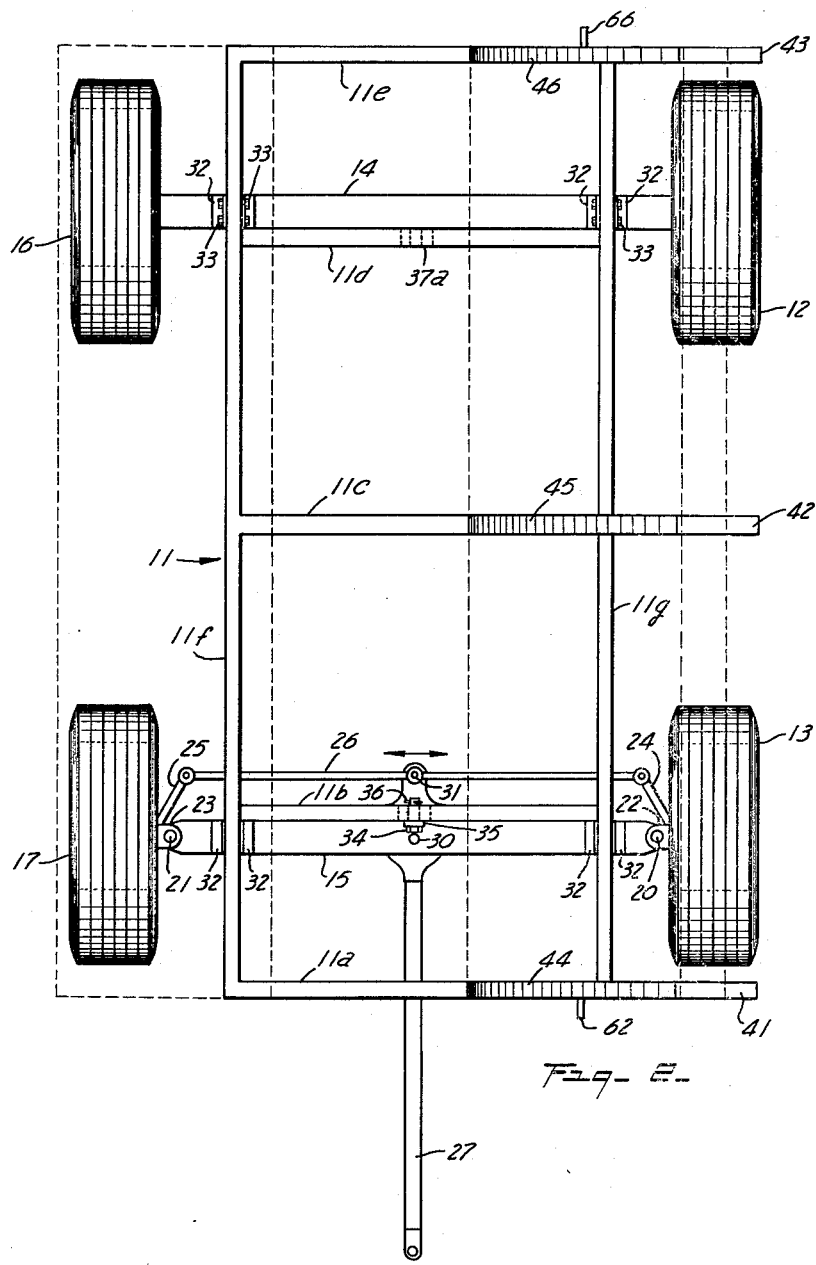
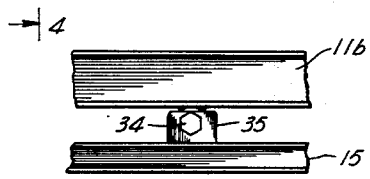
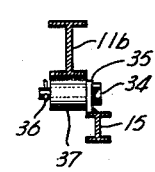

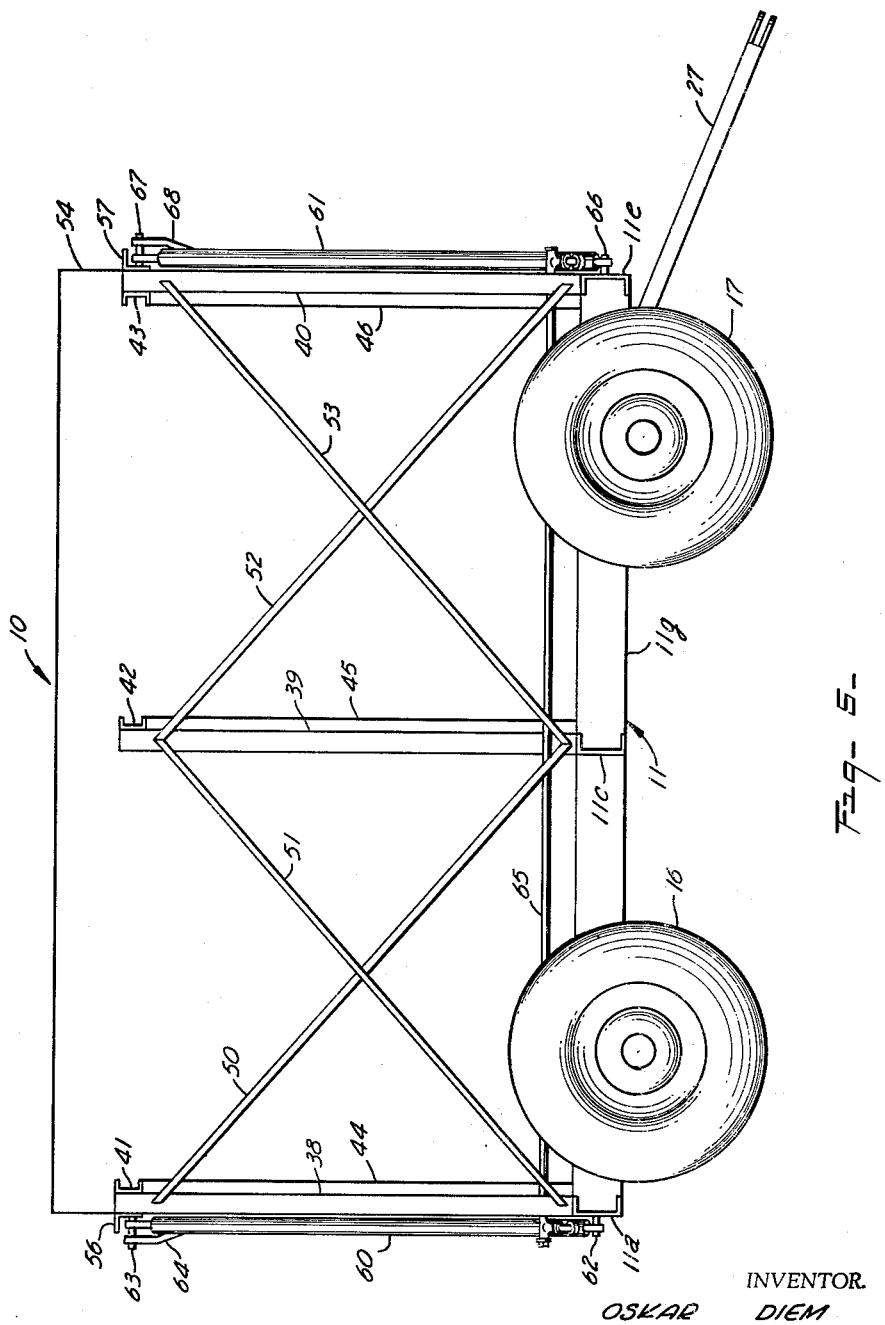

United States Patent Office 3,205,011
Patented Sept. 7, 1965

3,205,011
MULTI-PURPOSE DUMPING WAGON
Oskar Diem, Richardton, N. Dak., assignor to Richardton Machine & Manufacturing Company, Inc., Richardton, N. Dak., a corporation of North Dakota
Filed May 13, 1963, Ser. No. 279,874
6 Claims. (Cl. 298—10)

This invention relates to the field of bulk handling vehicles and more particularly to a vehicle for hauling sugar beets or the like.

The present invention contemplates a vehicle having a box which may be dumped about an axis substantially at the same level as the top of the vehicle box. The device also incorporates means for reversing the box and supporting carriage with respect to the chassis so that the box may be dumped to either side depending upon the type of beet picker being used and the type of discharge vehicle which will receive the sugar beets. The vehicle has the box supported at a low position for traveling over the surface of the ground which is sometimes quite uneven and in its extended position during the dumping operation, the side of the vehicle box is higher than that into which it is being dumped. The device is one employing rather large tires for movement over the ground and the entire structure is over eight feet high when carrying a load and may be extended upwardly so that a truck having its box eight feet above the ground may receive the load.

It is therefore a general object of the present invention to provide an improved vehicle for hauling and dumping bulk articles.

It is another object of the present invention to provide a dump box on a vehicle for hauling bulk material having hydraulic means for rotatably raising the box above the level of a receiving vehicle.

It is still another object of the present invention to provide a vehicle having a box for dumping bulk materials into a receiving truck by rotation only of the box.

It is yet another object of the present invention to provide a vehicle in which the box for containing bulk material to be dumped, may be dumped to either side.

It is still a further object of this invention to provide a vehicle in which the box and supporting structure of a vehicle may be reversed with respect to its chassis.

These and other objects and advantages of this invention will more fully appear from the following description, made in connection with the accompanying drawings, wherein like reference characters refer to the same or similar parts throughout the several views, and in which:

FIG. 2 is a top view of the vehicle chassis and carriage frame showing the outline of the box superimposed thereover;

FIG. 3 is a partial view showing the releasable pivot means for joining the steerable portion of the chassis to the carriage frame;

FIG. 4 is an end view of the structure shown in FIG. 3; and

FIG. 5 is a side view of the vehicle structure, showing in more detail the extended side of the box and hydraulic system.

Figure 1:
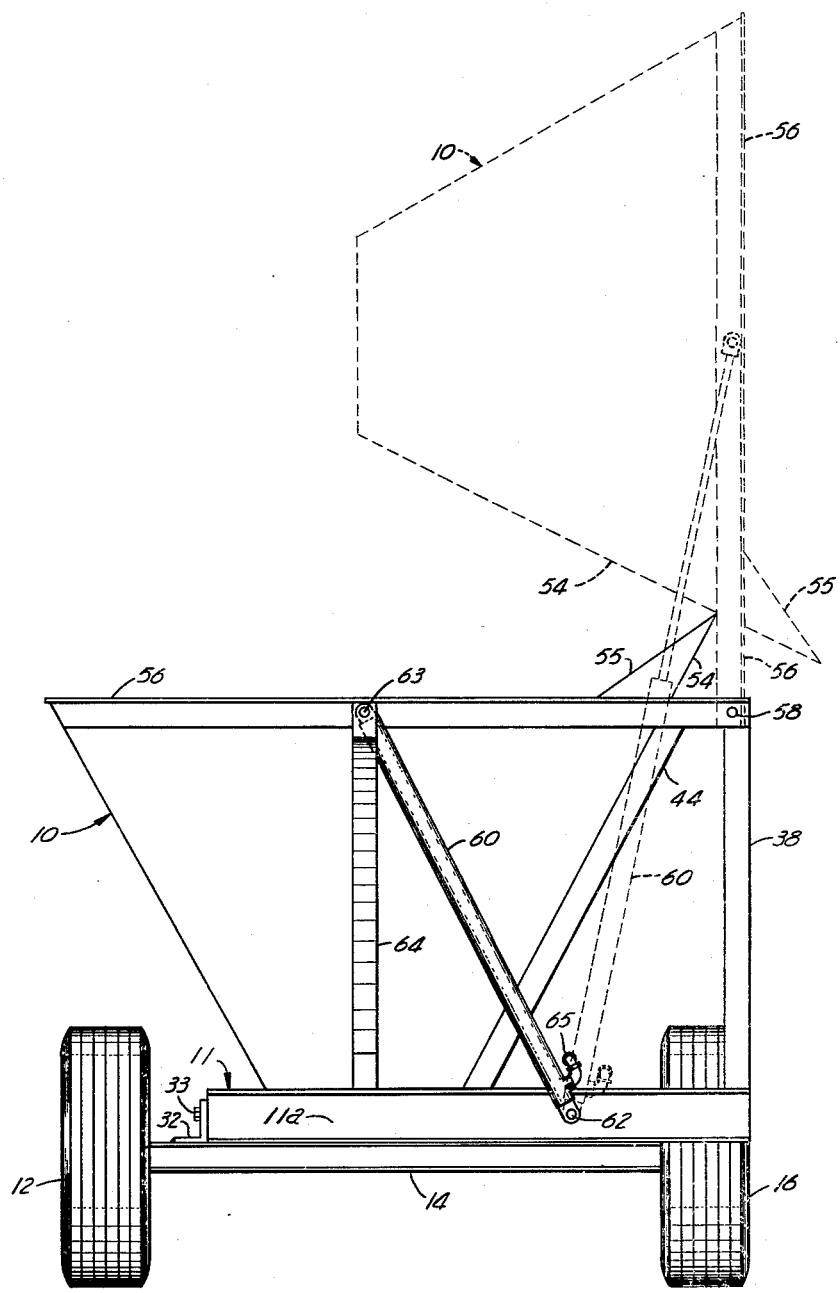
FIG. 1 is a rear view of an embodiment of the invention showing the box in loading and unloading position.

In the rear view of the vehicle as shown in FIG. 1, there is found a box 10 which is formed in a trough shape or is formed of a V-shaped cross-section with the lower portion of the box resting upon a carriage frame 11. Carriage frame 11 has a plurality of horizontally and laterally extending members 11a, 11b, 11c, 11d, and 11e. Carriage frame 11 has a pair of side members 11f and 11g which are connected to each of the horizontal and laterally extending cross members 11a through 11e and these may be formed by suitable means such as welding or being secured by bolts, rivets, etc. In other words, there is formed a ladder-like structure and the carriage frame may be formed from channel iron having an eight inch depth. It will be recognized that the frame and associated structure must support a great deal of weight. It will also be seen that laterally extending members 11a, 11c, and 11e extend outwardly beyond side member 11g and in fact, extend beyond the track of the vehicle created by a pair of wheels 12 and 13 which are supported for rotation about a common pair of axles. A steerable chassis for the vehicle is formed from a pair of cross-members 14 and 15 which support frame 11. Members 14 and 15 may be formed from a five inch H beam or other suitable material to support the load for which the box 10 is intended. Another wheel 16 is rotatably supported on an axle at the end of beam 14 and a wheel 17 is rotatably supported upon an axle opposite wheel 13 at the end of beam 15. Since it is desirable to steer wheels 13 and 14, a pair of vertical pivot pins generally known as king pins 20 and 21 are used to rotatably secure a pair of clevises 22 and 23 respectively to beam 15 in normal fashion. Secured to clevis 22 is an arm 24 which may be secured by welding or other suitable means and secured to clevis 23 is an arm 25. Arms 24 and 25 are connected by a common rod 26 and it will be recognized that upon a lateral movement of arm 26, that wheels 13 and 17 will pivot about pins 20 and 21 respectively so that the vehicle may be steered. To provide the steering function, a tongue 27 is pivotally secured to beam 15 by a pin 30 which passes vertically through beam 15 and secures the tongue thereto so that it may be rotated. Another pin 31 rotatably secures tongue 27 at a point rearwardly of pin 30 to rod 26 so that the device may be steered.

Means in the form of a plurality of plates 32 which are all identical are used to secure the chassis members to the carriage frame. The plates 32 are L-shaped and as will be explained more fully later, are used to secure beam 14 supporting the rear wheels 12 and 16 to carriage frame 11. This is accomplished by passing bolts 33 or other suitable releasable devices through side members 11f and 11g to secure the carriage frame to the chassis while the other portion of the L-shaped plate 32 may be welded to beam 14. The support at the front end of the vehicle is formed in a different manner as the carriage frame 11 is pivotally supported to chassis member or beam 15 by a large pin 34 which passes through a vertically extending lug 35. A smaller pin 36 passes through a hole formed in the end of pin 34 to keep it secured in its normal position. It is obvious that pin 34 may be formed from a bolt or any suitable structural member which will provide pivotal rotation. Lug 35 is generally welded to member 15 to secure a rigid support. To complete the pivotal connection, a bearing member 37 is welded to cross-member 11b and the bore formed therein is in alignment with the bore in lug 35 so that pin 34 passes through both members and is secured in place with smaller pin 36. Another bearing member 37a is shown in dashed lines below cross-member 11d at the rear of the vehicle.

It will be readily apparent that members 15 and 14 may be turned around, or in other words, the steerable portion of the vehicle may be reversed so that the members extending beyond the track of the wheels are on the opposite side. The purpose for this arrangement is quite apparent, in that in some instances it may be desirable to have box 10 dump to the opposite sides and therefore, it is highly desirable to make such a change without having to dismantle the entire structure to do so. Such an arrangement has been just described. For a more detailed view of the pivotal arrangement, reference is made to FIGS. 3 and 4. Since the chassis member 15 is pivotally supported with respect to frame cross-member 11b, plates 32 may have holes formed therein to receive bolts or other suitable structure but such are not used at the front of the device and, therefore, the wheels 13 and 17 are allowed to rise and fall with the contour of the surface over which they are passing due to rotational movement about pin 34 thereby providing a more stable support for the box which is carried upon the carriage frame.

This arrangement for reversing the chassis with respect to the carriage frame is readily apparent from the different views of the same structure and especially with the reversal of the carriage structure with respect to the chassis structure shown in FIGS. 1, 5, and 2. In other words, structure in FIGS. 1 and 5 is reversed from that shown in FIG. 2.

Three upright frame members 38, 39, and 40, are connected by welding or other suitable means to laterally extending members 11a, 11c, and 11e respectively. In other words, at the extreme ends of members 11a, 11c, and 11e, members 38, 39, and 40 are extended vertically upwardly and connected thereto are three horizontal channel members 41, 42, and 43 serving as braces. These braces extend inwardly towards the box and brace 41 is connected to another brace member 44 which extends downwardly at an angle towards the center of the carriage frame assembly and against the box 10. This is best shown in FIG. 1. The lower end of brace 44 is connected to carriage member 11a. In like manner, a brace 45 is connected to horizontal brace 42 and is connected by welding or other suitable means to carriage member 11c at the other end and a brace member 46 is connected at its upper end to brace 43 and its lower end to carriage member 11e. To reduce any side sway and produce rigid members from the braces, there is situated four diagonal brace members 50, 51, 52, and 53. Brace members 50 and 51 extend between upright members 38 and 39 in X fashion and braces 52 and 53 extend between upright members 39 and 40 in a similar X fashion. These are secured by suitable means such as welding or through the use of rivets or bolts.

Box 10, also has an elongated side 54 which extends above the upper portions of upright members 38, 39, and 40 to form a lip portion when the device is being dumped. The lip portion has supporting and bracing side elements 55 which may be secured or welded to a pair of reinforcing members 56 and 57 which extend across the upper ends of box 10. Member 56 is supported for rotation about a pin or bolt 58 which is connected through upright member 38 and a similar pin is used to rotatably support reinforcing member 57 at the upper portion of upright element 40. It will be noted specifically that reinforcing member 56 extends beyond the edge of box 10 which is formed by side 54 before being connected to pivot member 58.

A pair of hydraulic cylinder and piston assemblies 60 and 61 are used to raise box 10 rotatably about pivots 58 and thereby provide a box which may be dumped into an adjoining vehicle. Hydraulic and piston assembly 60 is pivotally connected to carriage member 11a about a pin 62 at its lower end. The pin is situated between the upright brace member 38 and the side of box 10 formed by side 54. As shown, pivot pin 62 is approximately half the distance between brace member 38 at a point where side 54 joins the bottom of box 10 and rests upon carriage member 11a. The upper end of hydraulic cylinder and piston assembly 60 is connected to reinforcing member 56 by a pin 63 which is located centrally along the upper edge of the end of box 10. A brace member 64 is welded or secured to the bottom end of box 10 and to reinforcing member 56 so that pin 63 is supported in a manner to carry the load in the box 10. A hydraulic line 65 is connected to the end of hydraulic cylinder and piston assembly 60 and is formed so that it may be connected to additional vehicles behind or ahead of the wagon if so desired or may be connected to a hydraulic system adjacent the wagon when it reaches the station for dumping. Hydraulic line 65 is connected to cylinder and piston assembly 61 which has a lower pivotal pin 66 located in the same relative alignment as that of pin 62 with respect to the brace members and carriage frame members. In like manner, a pin 67 is located at the upper end of cylinder and piston assembly 61 to form a pivotal support therefor and a brace 68 formed in the same manner as brace 64 provides additional support for pin 67 to raise the box.

As explained earlier, the box 10 may be rotated above the upright members 38, 39, and 40 so that box 10 may be dumped into an adjoining vehicle to unload bulk articles such as sugar beets or the like. Where it becomes convenient to have the box dumped to the opposite side, the chassis members may be readily reversed with respect to their direction of movement and the box would then be dumped to the opposite side. It should be particularly noted that the hydraulic cylinder and piston assemblies have their pivot points located in a manner such that the angle through which the cylinder and piston assemblies rotate is at a minimum. This is seen by observing the dotted line position of the cylinders when the box 10 is in its dumping position. Generally speaking, numerous attempts have been made to obtain longer lengths of the stroke provided by the cylinder and piston assembly by cable or bracket arrangements which are cumbersome and mechanically complicated. The present structure allows a full extension of the rod between the piston and cylinder assembly such that upon its being extended its full length, box 10 is in an emptying position thus providing an efficient use of that particular hydraulic piston and cylinder assembly in lifting the box.

As shown and disclosed herein, a vehicle for hauling and dumping bulk articles is set forth which utilizes a pair of hydraulic cylinder and piston assemblies, which upon full extension provide a dumping function for the box. The carriage assembly has also been structurally formed in such a manner that the chassis may be readily reversed with respect to the carriage frame and thereby make versatile use of the dumping vehicle. There is also shown and described herein, a means for allowing the front wheels of the vehicle to be pivotally supported about a longitudinal axis of the vehicle such that the front wheels may travel over the contours of the ground to provide a more stable support for the box. By using the structural members which extend beyond the side of the box and which are pivotally supported at the ends thereof, a wagon is provided having the desirable feature of being able to lift a load above the pivot points to facilitate dumping into an adjoining truck or vehicle having a box of higher elevation than the normal height of the wagon box in its lowered position. In fact, as the box is rotated, the extended side and lip portion are rotated over the truck box side and may extend slightly downward thereinto.

It will, of course, be understood that various changes may be made in the form, details, arrangement and proportions of the parts without departing from the scope of this invention which consists of the matter shown and described herein and set forth in the appended claims.

What is claimed is:

1. A vehicle for hauling and dumping bulk articles comprising:
   (a) a steerable chassis adaptable to support a carriage frame having a plurality of rotatable wheels for engaging the surface over which the vehicle travels;
   (b) a carriage frame secured to, and supported by, said steerable chassis, said frame having a plurality of horizontally and laterally extending members extending on one side, outside of and beyond the path of travel created by said wheels;
   (c) vertically extending upright frame elements securely fastened to said carriage members at a point laterally outside of and beyond said path of travel, said elements including braces fastened between said upright elements and said laterally extending carriage frame members;
   (d) a box for containing the bulk articles having sloping sides and closed ends joining a bottom, the bottom of which normally rests on said carriage frame and one side of which is disposed adjacent said braces, said ends having laterally extending portions extending beyond said one side and being rotationally attached to said upright frame elements;

(e) and a pair of hydraulic cylinder and piston assemblies adapted to receive hydraulic fluid under pressure for extending said pistons relative to said cylinders, each of said assemblies pivotally connected to one of said box ends at an uppermost position thereon midway between said box sides and to said laterally extending carriage members at a position between where said upright frame elements are connected to said carriage members and the nearest edge of said box bottom so that said box may be rotated until said one side attached to said frame elements has rotated beyond a horizontal position allowing said box to be emptied.

2. The invention as set forth in claim 1 wherein said laterally extending end portions include a pair of reinforcing members fixedly secured across the upper edges of said ends and extending laterally beyond said one side of said box, the end portion of which is rotatably attached to said upright frame elements whereby said one side is elevated above said upright frame upon being rotatably elevated by said pair of hydraulic cylinder and piston assemblies.

3. The invention as set forth in claim 2 wherein said one side adjacent said braces extends above said upright frame elements to form a laterally extending lip when said box is rotated into a dumping position.

4. The invention as set forth in claim 1 including releasable means for securing said carriage frame to said steerable chassis, said chassis being adapted to be reversed with respect to said carriage frame facilitating dumping of said box to either side.

5. The invention as set forth in claim 4 wherein said releasable means pivotally connects said carriage frame to said chassis about a horizontal axis extending parallel to the center line of said box extending in the general direction of travel of the vehicle.

6. In a vehicle for hauling and dumping bulk articles, apparatus comprising:

(a) a box for containing the bulk articles having sides and closed ends joining a bottom, said box ends including laterally extending transverse members disposed at the uppermost portions extending beyond one of the sides thereof and adapted for rotation about the ends thereof;

(b) frame means adapted to be connected to a steerable chassis and having upwardly extending elements rotatably connected to said laterally extending members of said box ends;

(c) and hydraulic means adapted to receive hydraulic fluid under pressure for causing actuation thereof, said hydraulic means pivotally connected between said frame means and said box to rotate said box above said upwardly extending elements of said frame means as said laterally extending transverse members are rotated about their ends to a position allowing said box to be emptied from a height above the point of rotation equal to the amount said laterally extending transverse members extend beyond said one side.

References Cited by the Examiner

UNITED STATES PATENTS

| | | | |
|---|---|---|---|
| 2,105,329 | 1/38 | Orlowsky | 214—501 |
| 2,234,599 | 3/41 | Johnston | 298—11 |
| 2,286,416 | 6/42 | Holmstrom | 298—18 |
| 2,675,247 | 4/54 | Meng | 280—103 X |
| 2,812,210 | 11/57 | Osborn | 298—18 |
| 3,083,058 | 3/63 | Walstrom | 298—11 |

ARTHUR L. LA POINT, *Primary Examiner.*

RALPH D. BLAKESLEE, *Examiner.*